INVENTORS
PAUL K. ADCOCK, SR.
and CARL G. SCHROEDER
BY Michael Williams
ATTORNEY

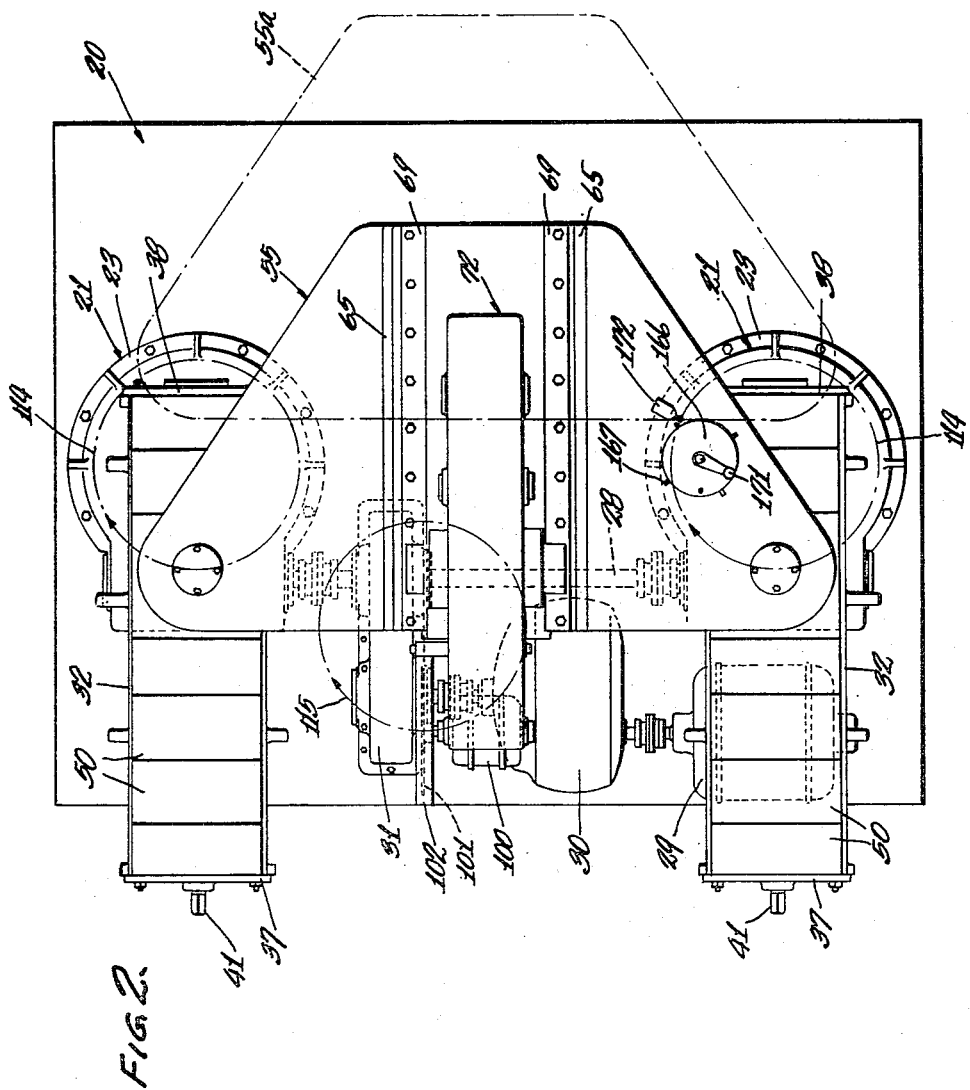

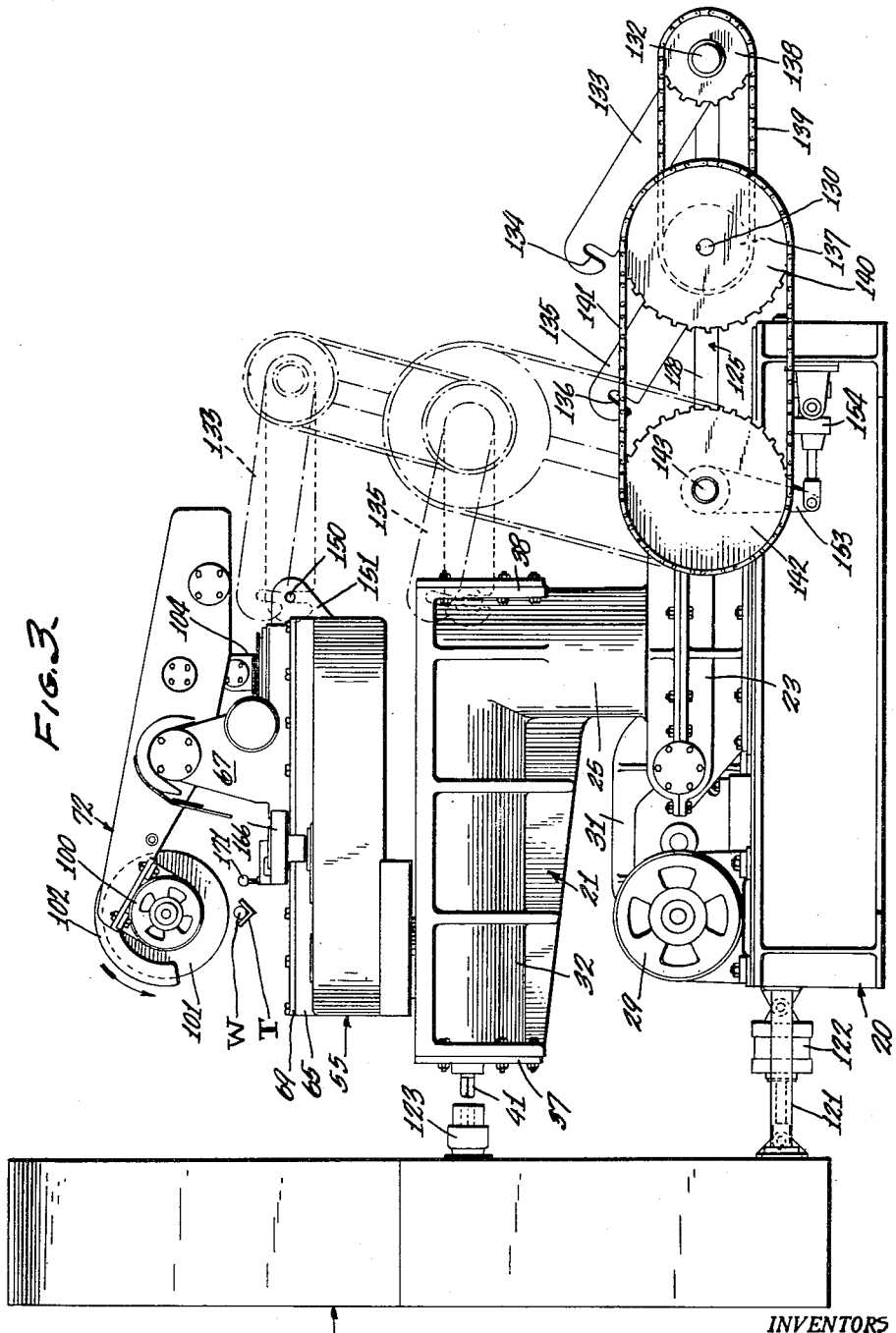

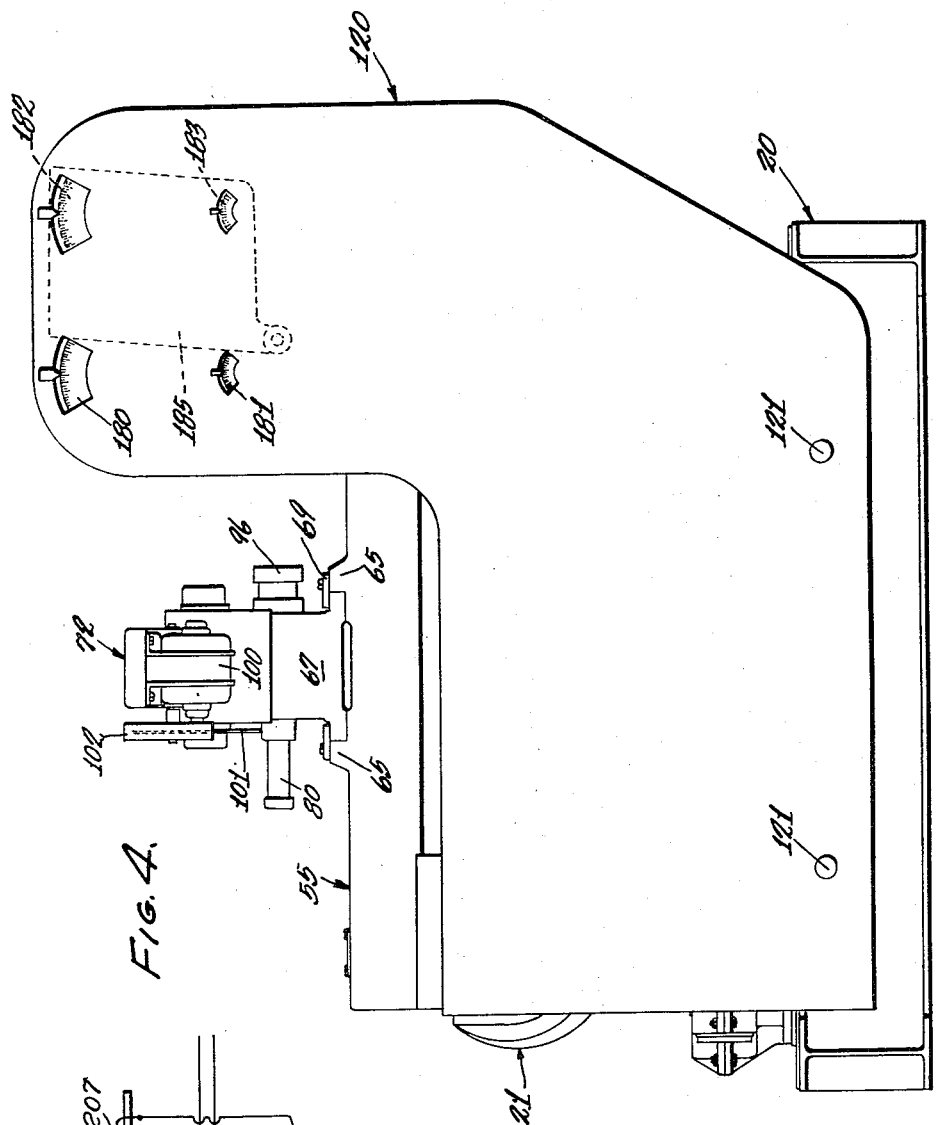

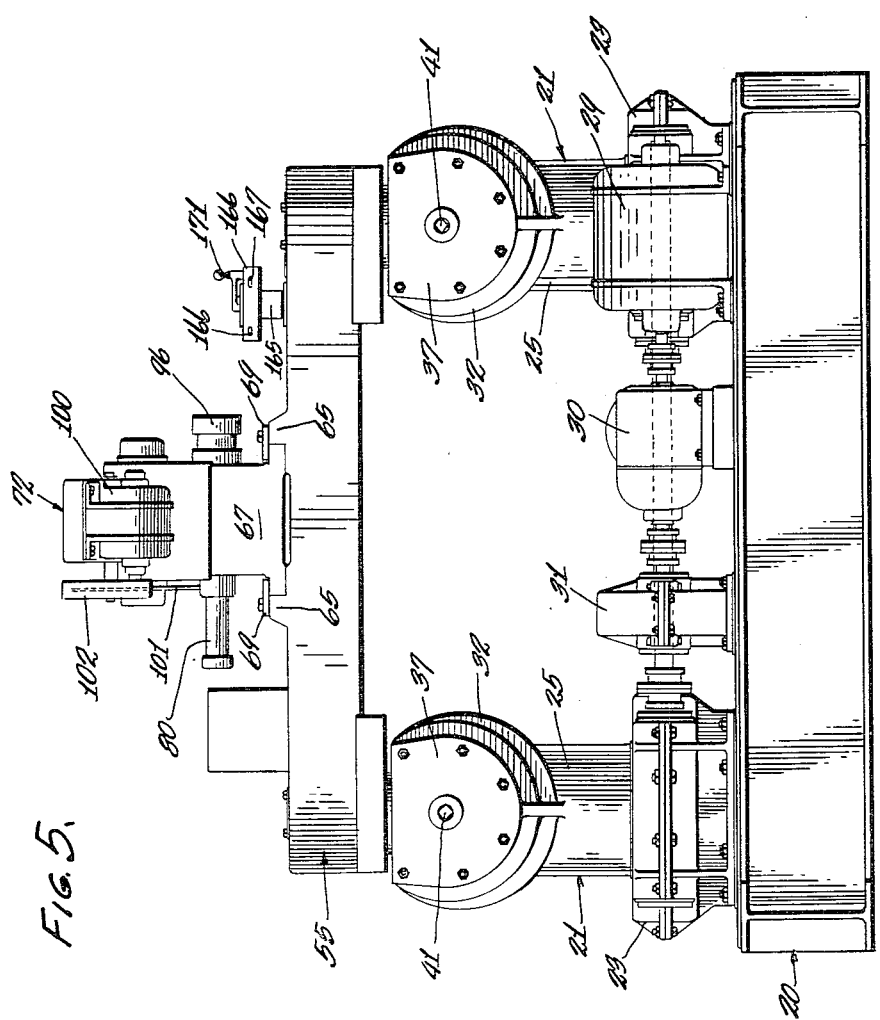

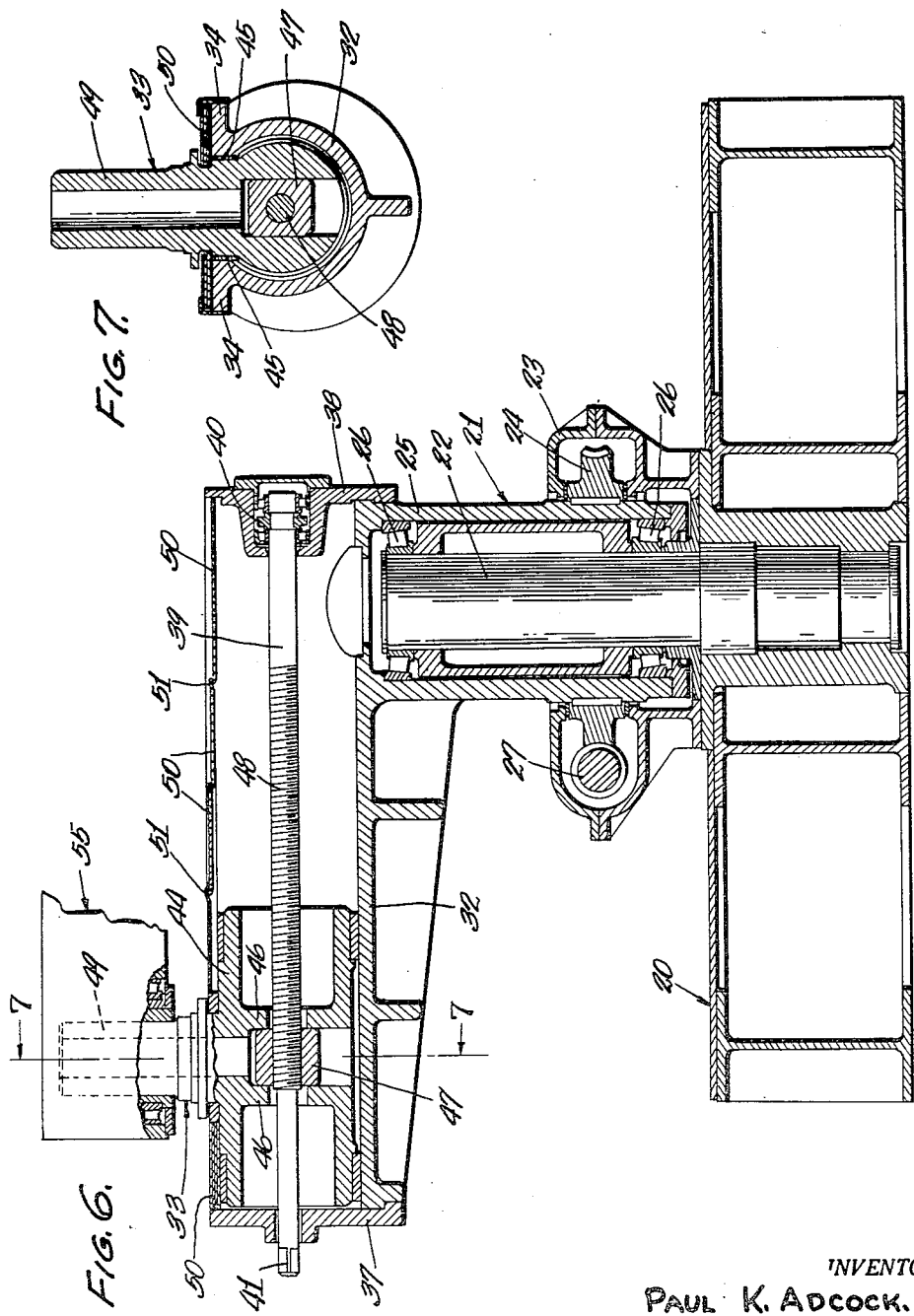

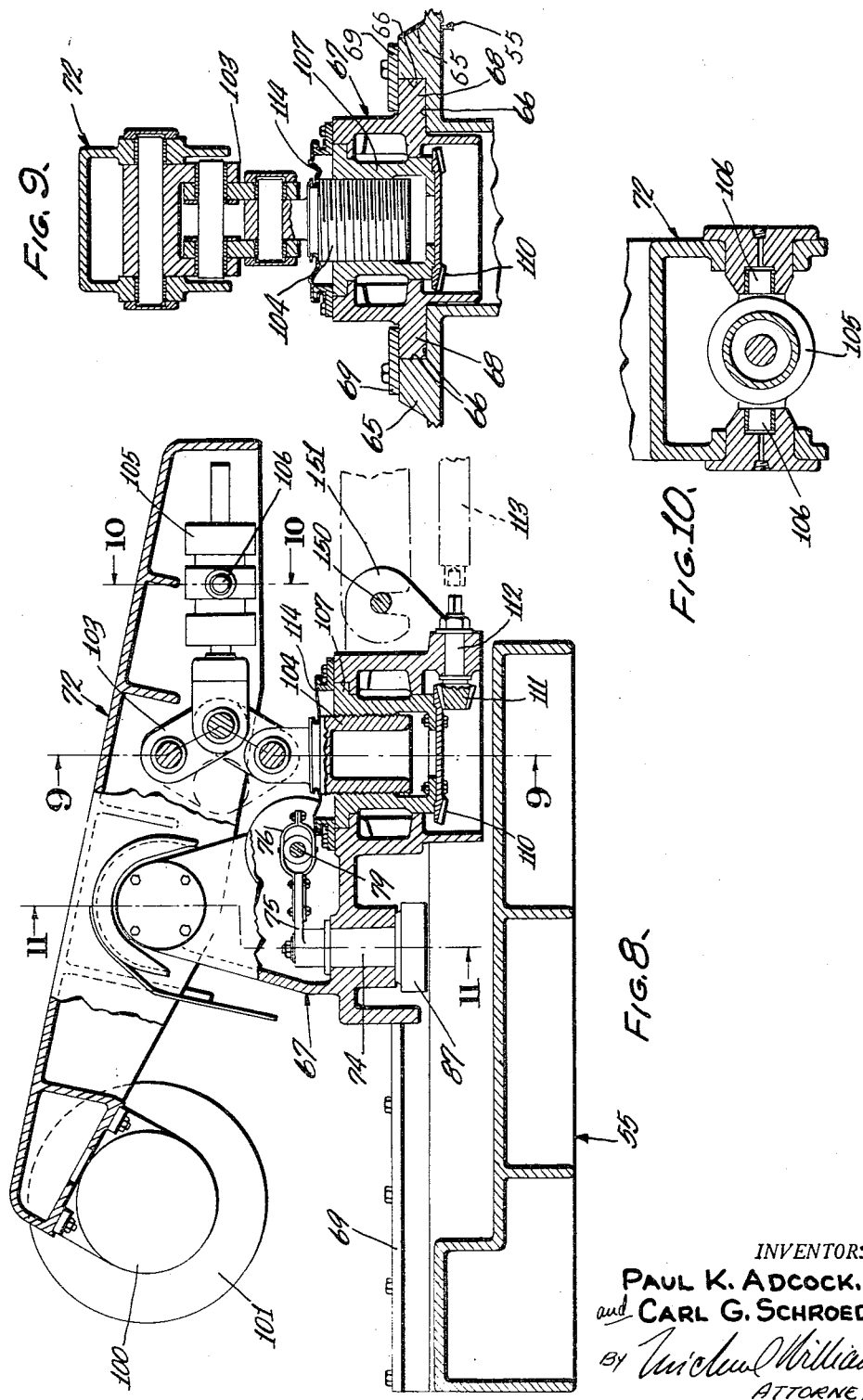

Sept. 4, 1956  P. K. ADCOCK, SR., ET AL  2,761,504
MECHANISM FOR CUTTING MOVING WORK
Original Filed April 17, 1948  10 Sheets-Sheet 8
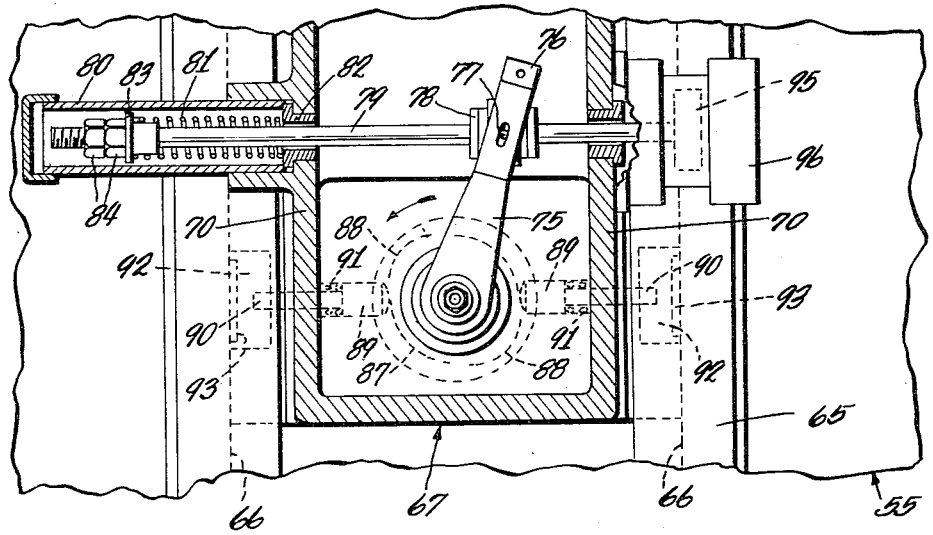
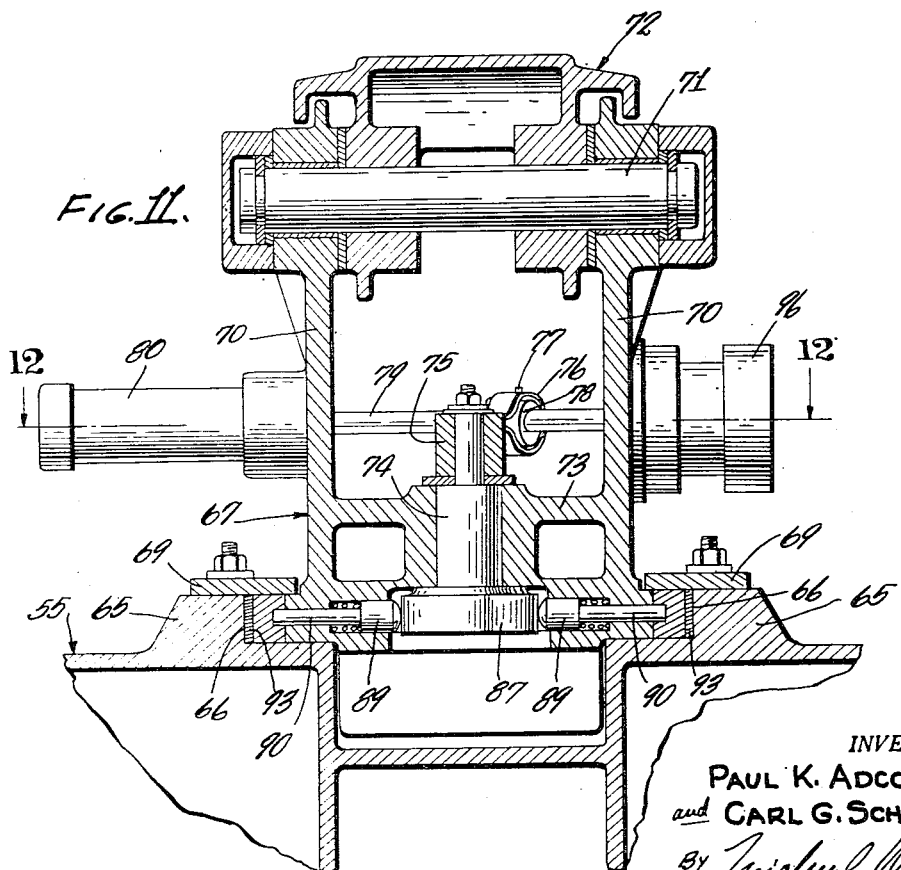
INVENTORS
PAUL K. ADCOCK, SR.
and CARL G. SCHROEDER
By Michael Williams
ATTORNEY

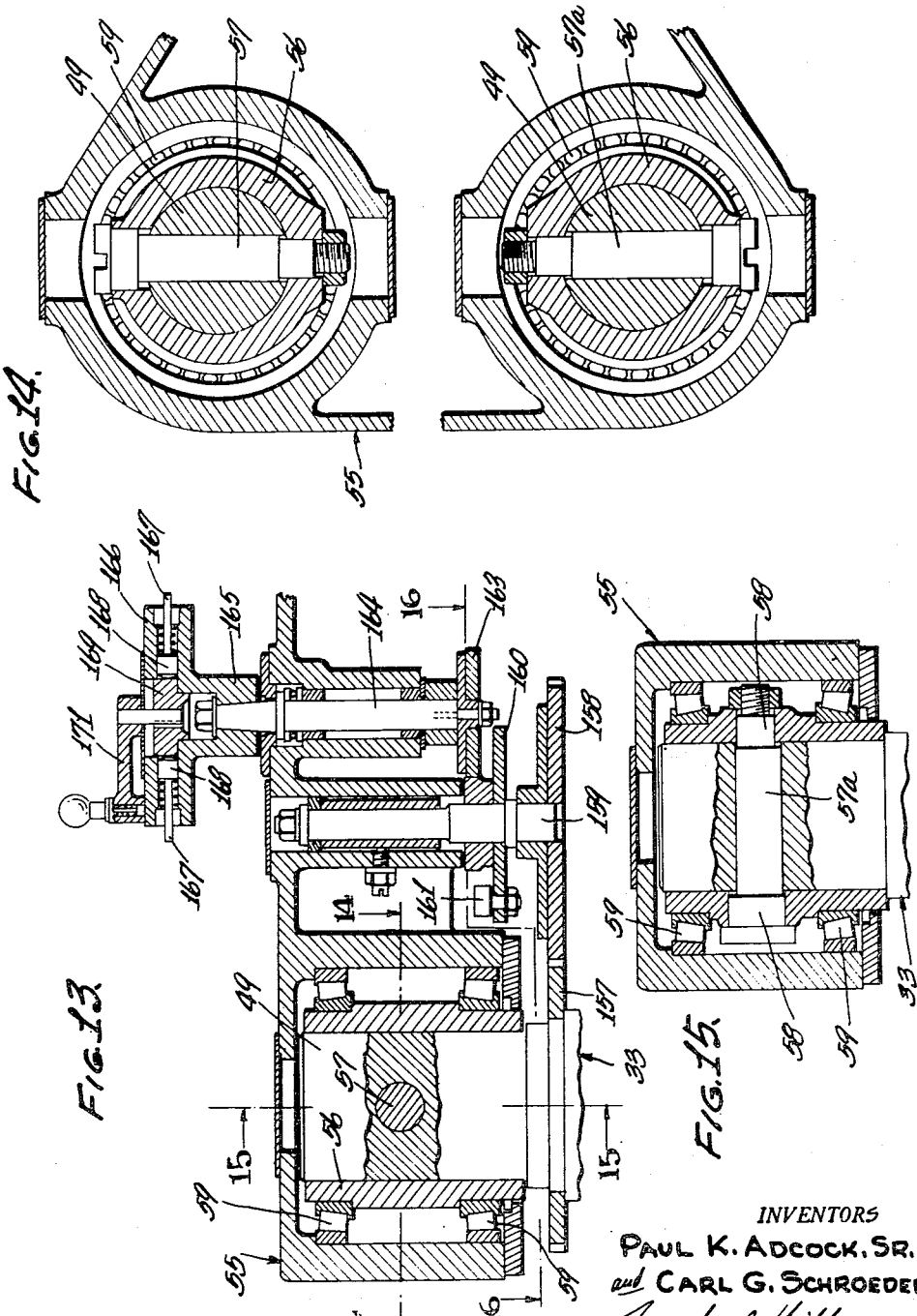

Sept. 4, 1956  P. K. ADCOCK, SR., ET AL  2,761,504
MECHANISM FOR CUTTING MOVING WORK
Original Filed April 17, 1948  10 Sheets-Sheet 10
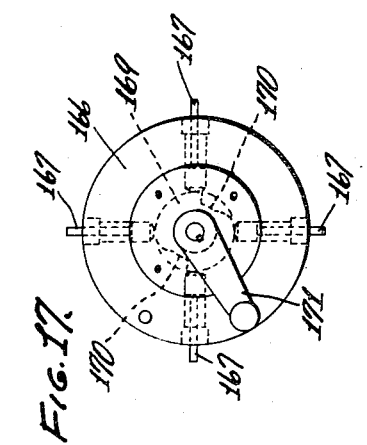
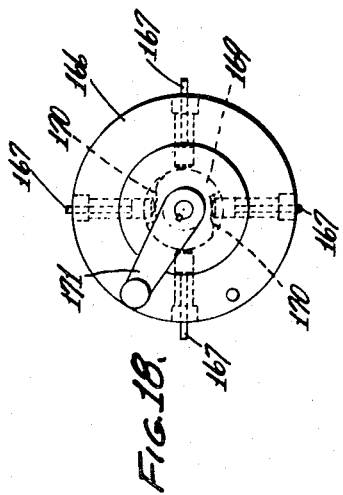
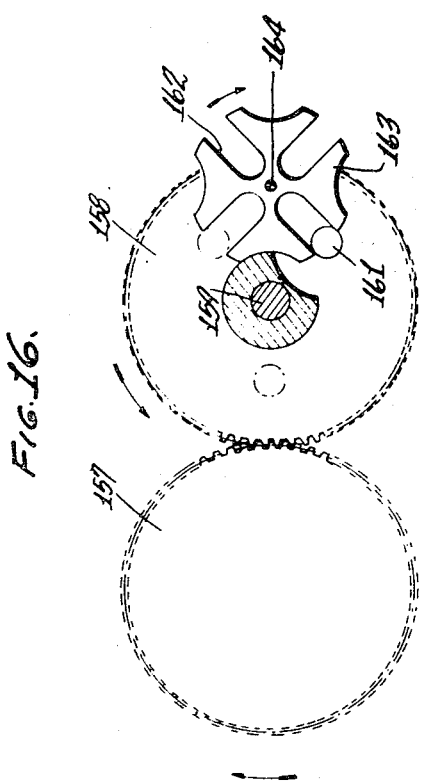
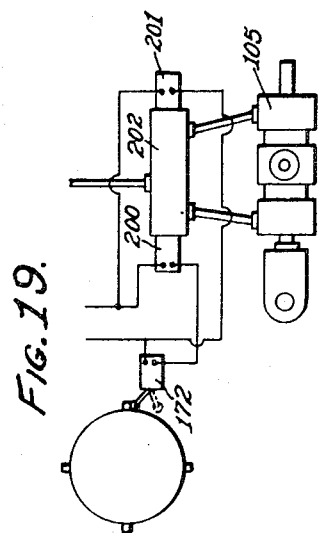
INVENTORS
PAUL K. ADCOCK, SR.
and CARL G. SCHROEDER
BY
ATTORNEY

United States Patent Office 2,761,504
Patented Sept. 4, 1956

---

2,761,504

MECHANISM FOR CUTTING MOVING WORK

Paul K. Adcock, Sr., and Carl G. Schroeder,
Youngstown, Ohio

Continuation of abandoned application Serial No. 21,608, April 17, 1948. This application May 6, 1952, Serial No. 286,318

19 Claims. (Cl. 164—60)

Our invention relates to cutting mechanism, more particularly to such mechanism for cutting work which is moving, and the principal object of our invention is to provide new and improved mechanism of this character. This application is a continuation of an application filed April 17, 1948, Serial Number 21,608 for Cutting Mechanism, now abandoned.

Our invention has particular use as a disc cutter, either plain or serrated, for cutting pipe formed by the Fretz-Moon process, although it will be appreciated that it is not limited to such application, but may be used for cutting any type of moving work.

Referring particularly to the formation of pipe by the Fretz-Moon process, a serious limitation to this process has been the inability to cut pipe to desired lengths at the ultimate speed at which pipe could be formed. Accordingly, the cutting operation has been the factor which limits the speed at which pipe may be produced, thus materially reducing production and likewise increasing production costs.

Our invention provides a machine that will cut off pipe at the ultimate speed at which it can be formed. Further, a machine incorporating our invention will cut off moving pipe, or any other moving work, in any desired length, adjustment being provided whereby fractional changes in length may be made with relative ease, and whereby multiples of the lengths set for may be automatically made.

In the drawings accompanying this specification and forming a part of this application, there is shown, for purpose of illustration, an embodiment which our invention may assume, and in these drawings:

Figure 2 is a plan view similar to Figure 1, with parts in different adjusted position, and with parts omitted.

Figure 3 is a side elevational view of the machine shown in Figure 1,

Figure 1:
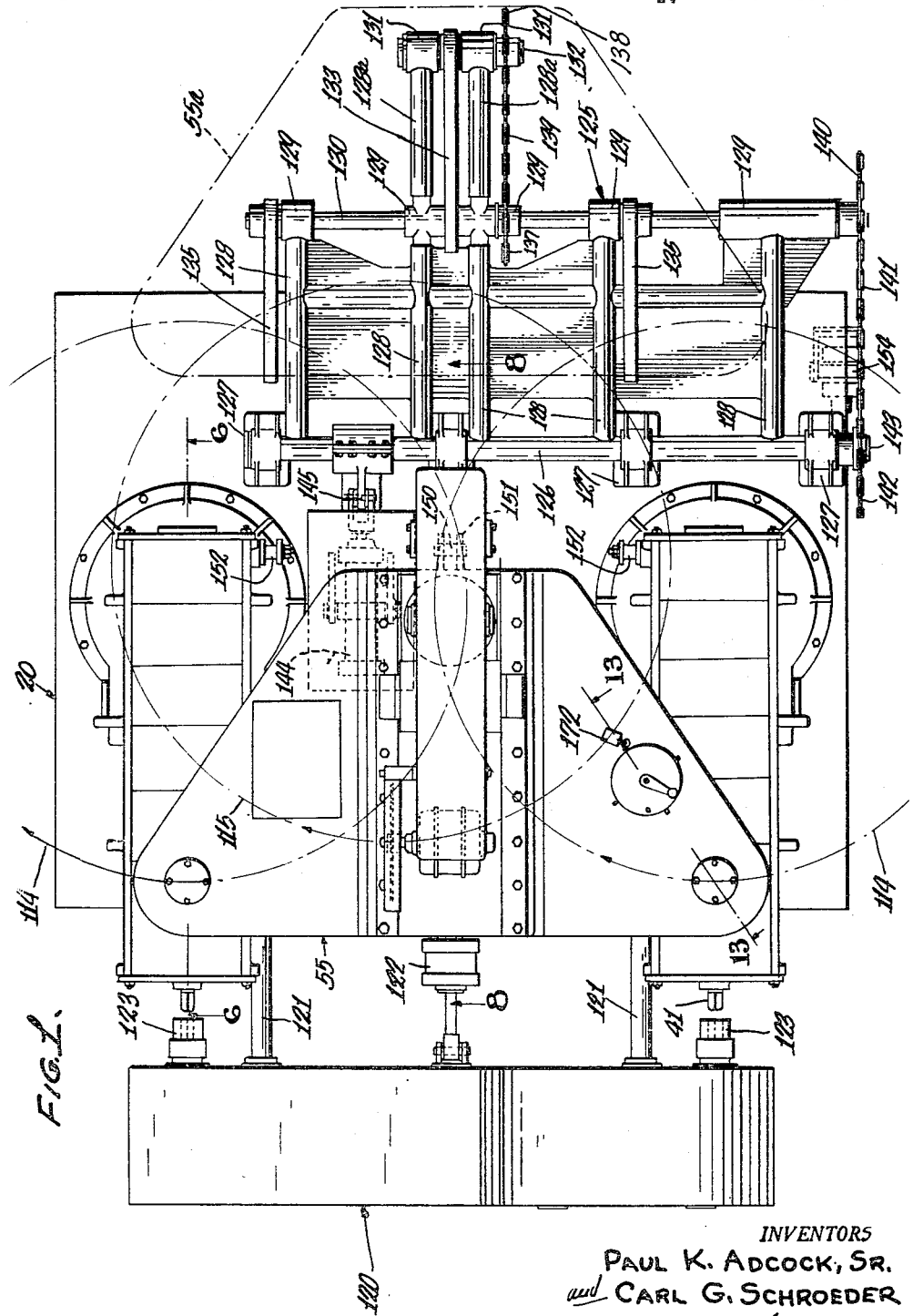
Figure 1 is a plan view of a machine embodying our invention.

Figure 4 is an end elevational view of the machine shown in Figure 3, looking generally in the direction shown by arrow 4—4 in Figure 3, Figure 4a is a diagrammatic view illustrating a control for a shutter mechanism, Figure 5 is an end elevational view similar to Figure 4, with parts omitted, Figure 6 is a sectional view corresponding generally to the line 6—6 of Figure 1, with parts omitted, Figure 7 is a sectional view corresponding generally to the line 7—7 of Figure 6, with parts omitted, Figure 8 is a fragmentary sectional view corresponding generally to the line 8—8 of Figure 1, with parts omitted, Figure 9 is a fragmentary sectional view corresponding generally to the line 9—9 of Figure 8, Figure 10 is a sectional view corresponding generally to the line 10—10 of Figure 8, Figure 11 is a fragmentary sectional view corresponding generally to the line 11—11 of Figure 8, Figure 12 is a fragmentary sectional view corresponding generally to the line 12—12 of Figure 11, Figure 13 is an enlarged fragmentary sectional view corresponding generally to the line 13—13 of Figure 1, Figure 14 is a broken fragmentary sectional view corresponding generally to the line 14—14 of Figure 13, Figure 15 is a fragmentary sectional view corresponding generally to the line 15—15 of Figure 13, Figure 16 is a sectional view corresponding generally to the line 16—16 of Figure 13, Figures 17 and 18 are detail views showing various settings of the multiple control, and Figure 19 is a diagrammatic view illustrating circuits and apparatus affected by the multiple control.

Referring to the drawings, the machine herein shown to disclose our invention comprises a base 20 on which is mounted substantially all of the operating parts.

Extending upwardly from the base 20 are two platen supports 21 of substantially identical construction, so that description of one also applies to the other. Each support 21 comprises an upright shaft 22 (see Figure 6) rigidly carried by the base 20. Also carried by the base, in position above a respective upright shaft 22, is a worm gear housing 23 which encloses a worm gear 24 keyed to a sleeve 25 disposed about its respective shaft 22 and extending upwardly from the base 20. Combined thrust and roller bearings 26 suitably support the sleeve 25 in position with respect to a respective shaft 22.

A worm 27 is provided for cooperation with each of the worm gears 24, these worms being fixed to a shaft 28 (see Figure 2). The shaft 28 is driven in any suitable manner, such as by means of an electric motor 29. As best seen in Figure 2, the armature shaft of the motor is coupled to a variable-speed drive mechanism 30 which is preferably of a commercially available type providing for an infinite number of speed changes.

The out-put of the variable-speed drive mechanism 30 is coupled to gears contained in a gear housing 31, such gears transmitting power to the shaft 28.

Each sleeve 25, at its upper end, is formed with a radially extending trough-shaped portion 32 of generally cylindrical cross-section (see Figures 3, 5 and 7), and open at the top to provide for reciprocation of a pintle-shaft structure 33 longitudinally of the trough-shaped portion 32.

At its open upper end, the trough-shaped portion 32 is formed with longitudinally extending side flanges 34 for a purpose later to appear. The ends of trough-shaped portion 32 are closed by cap-plates 37 and 38 which provide a guide and a bearing for a longitudinally extending shaft 39. One end of the shaft 39, at the cap-plate 38, is formed with a collar 40 which is held between bearings to limit the shaft to rotational movement only. The other end of the shaft extends outwardly of the cap-plate 37, and is formed with a square end 41 to facilitate engagement with a wrench unit later to be described.

Each of the pintle-shaft structures 33 comprises a body 44 fitting within the trough-shaped portion 32, bearing strips 45 being interposed between adjoining slide surfaces to facilitate longitudinal movement of the pintle-shaft structures. Each body 44 has internal spaced-apart walls 46 confining therebetween a nut 47 which is threaded upon a screw-threaded portion 48 of the shaft 39. Extending from the body 44, through the top opening in the trough-shaped portion 32, and upwardly therefrom, is a pintle-shaft 49 for a purpose later to appear.

It will be appreciated that as the shaft 39 of each platen support 21 is rotated, such movement causes corresponding movement of the pintle-shaft structure 33 along the ways defined by the bearing strips 45. Means may be provided to close and maintain closed the opening into the trough-shaped portion 32, regardless of the position of the pintle-shaft structure 33, and as here shown, such means comprises a plurality of plates 50 adapted to slide sequentially, each over its adjacent plate. The plates 50 have hook connections 51 so that the plates extend sequentially, each over its adjacent plate as the pintle-shaft structure 33 moves in a direction away from such plates, while the plates on the opposite side of the pintle-shaft structure 33 stack sequentially.

A platen 55 is carried by the pintle-shafts 49, and as best seen in Figures 6, 13, 14 and 15, each shaft 49 carries a sleeve 56 which is secured to the respective shaft by a pin 57 or 57a. One of the pins (pin 57a) is provided with eccentric portions 58 to provide for adjustment of the respective sleeve 56 axially of the shaft. Interposed between each sleeve 56 and adjoining wall surfaces of the platen 55 are spaced-apart combined thrust and roller bearings 59. The pin 57a provides for adjustment of the bearing between its respective sleeve and the adjoining walls of the platen, to compensate for any variation in construction.

Intermediate the shafts 49, the platen 55 is formed with spaced-apart guides 65 forming ways 66 for reciprocably carrying a slide body 67. As best seen in Figure 9, the slide body 67 has laterally extending slide portions 68 slidable along the ways 66. Gibs 69 are bolted to the guides 65 to maintain the slide portions 68 in proper sliding relation in the ways 66.

The slide body 67 includes spaced walls 70 (see Figure 11) which, at their upper end, provide journals for a cross-shaft 71. Pivotally mounted on the cross-shaft is a beam structure 72. A wall 73 is disposed transversely of the walls 70, and provides a bearing for an upright shaft 74. The upper end of the shaft 74 is reduced, and has fixed thereto one end of a lever 75, the opposite end of which is formed in the manner of a clevis 76, with a clevis pin 77 operably fitting in a collar 78 carried by a shaft 79 which is slidable through openings in the walls 70.

One end of the shaft 79 extends outwardly of the adjacent wall 70, and into a cylinder 80 which is secured to such wall. A coil spring 81 encircles this end of the shaft 79, and is confined between two washers 82, 83, the washer 82 bearing against the wall 70, and the washer 83 being carried by the end of the shaft 79 and held in position by adjusting and lock nuts 84. From the foregoing, it will be appreciated that the spring 81 urges the shaft 79 to the left, as viewed in Figure 12, thus urging the lever 75 in a counterclockwise direction, as shown by the arrow in Figure 12.

Secured to the lower end of the shaft 74 is a cam 87 having two lobes 88 cooperable with heads 89 formed on diametrically extending pins 90. The pins are pressed by springs 91 in a direction so that the heads are constantly in engagement with the cam 87. The extremity of each pin carries a brake shoe 92 having brake lining 93 engageable with the ways 66.

Normally, the urging force of the spring 81 urges the lever 75 in a direction of the arrow in Figure 12, so that the cam lobes 88 push against respective heads 89 to urge the brake lining 93 into contact with the ways 66, and thus lock the slide body 67 against movement in the ways 66.

A fluid cylinder is provided to unlock the slide body 67, and as seen in Figure 12, the opposite end of the shaft 79 is connected to a piston 95 housed within a fluid cylinder 96. The cylinder is connected to a suitable source of fluid under pressure, and when it is desired to unlock the slide body 67, fluid is admitted to the cylinder 96 to urge the piston 95 to the right, as viewed in Figure 12, to rotate the lever 75 and move the cam lobes 88 out of contact with the heads 89 (as shown in Figure 12) so as to release pressure on the brake lining 93. When fluid supply to the cylinder 96 is discontinued, as by means of a suitable valve, the spring 81 will automatically rotate the lever 75 to urge the brake linings 93 into engagement movement in the ways 66. The valve for piston cylinder 96 and the fluid line are conventional and are not shown.

The beam structure 72 may be of any suitable construction, and as here shown is generally channel-shaped in cross-section and suitably ribbed against deflection. At the front side of the beam structure (left hand end as viewed in Figure 8) a cutting device is supported, which in the particular embodiment illustrated comprises a motor 100 of any suitable construction, but preferably being electrically powered.

Carried by the armature shaft of the motor 100 is a serrated (or plain) disc cutter 101 of any suitable type, and preferably of a type that will readily cut metal, either hot or cold. A guard 102, see especially Figure 5, may be carried by the motor casing, to guard against possible injuries which may be caused by a rapidly rotating cutter. The cutter is adapted to cut through work W (see Figure 3) which may be movable along a trough T, or may be supported in any other suitable manner.

Means are provided to cause vertical pivotal movement of the beam structure 72, and in this embodiment, such means comprises a toggle link connection 103 having its ends respectively pivoted to the beam structure (see Figure 8) and to an adjustment sleeve 104 movable with the slide body 67. The rod end of a fluid cylinder 105 is pivoted to the center of the toggle link connection 103, for the purpose of making or breaking the toggle. The fluid cylinder is preferably of the double-acting type, so that on one stroke it will move the toggle link connection 103 from full line to dotted line position shown in Figure 8, so as to cause rapid dipping and return of the cutter 101, whereby a cut in the work "W" may be made in a short period of time. For a subsequent cut, the cylinder 105 is reversed, so that the toggle link connection is moved from dotted line position to full line position shown in Figure 8. The cylinder is trunnioned, as seen at 106 to opposed walls of the beam structure 72, so that the cylinder may move in correspondence with the movement of the beam structure.

Means are provided to effect adjustment of the effective throw of the toggle link connection 103, and as herein disclosed, such means comprise the adjustment sleeve 104 which is threaded into a sleeve-like nut 107, the latter being rotatably carried by the slide body 67, but held against axial movement, so that rotation of the nut 107 causes raising or lowering of the adjustment sleeve 104, depending upon rotation of the nut. Such raising or lowering of the adjustment sleeve 104 causes further doubling or straightening of the toggle link connection 103, so as to increase or decrease the stroke of the cutter 101.

A bevel gear 110 is fixed to the lower end of the sleeve-like nut 107, and this gear meshes with a bevel gear 111 carried by a shaft 112 journalled in a portion of the slide body 67. The free extremity of the shaft 112 is squared or otherwise suitably shaped to receive a wrench 113. Rotation of the shaft 112 causes rotation of the nut 107. Since the adjustment sleeve 104 is restrained against rotation by its connection with the toggle link connection 103, it will be raised or lowered in the nut 107. A seal 114 may be used to prevent foreign matter from entering and interfering with the adjustment provided by the sleeve 104 and nut 107.

From the foregoing, it will be evident that when power is applied by the motor 29, through the variable speed drive 30, and gear box connection 31 to shaft 28, the pair of arm means formed by the sleeves 25 and integrally connected trough-shaped portions 32 will rotate about respective shafts 22. Rotation of the trough-shaped portions 32 will cause movement of the pintle shafts 49 respectively carried thereby in circular paths shown by broken lines 114 in Figures 1 and 2. Such circular movement of the pintle shafts will cause corresponding movement of the platen 55, so that the cutter 101 carried thereby will move in a closed path, as shown by the circular broken line 115 in Figures 1 and 2.

The platen 55, as will be understood, may be shifted from one extreme position shown in Figure 2, by proper rotation of the shafts 39 which regulate the position of respective pintle-shaft structure 33 relative to the axis of rotation of the sleeves 25. As seen in Figure 2, the platen has been adjusted so that the pintle shafts 49 revolve in a much smaller circle than the circle of movement shown in Figure 1. Accordingly, the shifting movement of the platen 55 is materially lessened in the adjustment shown in Figure 2. The broken lines 55a in Figures 1 and 2 show the extreme rearward position of the platen 55 in its shifting movements caused by the adjustments shown in Figures 1 and 2.

Means are provided to efficiently rotate the shafts 39 in both trough-shaped portions 32 at the same time and in equal amounts. Such means, in this instance, comprises a wrench unit 120 which is connected to the base 21 for movement toward and away from respective ends 41 of the shafts 39, by slide rods 121. A double-acting fluid cylinder 122, having connection with the wrench unit 120 and the base 20, provides power to effect sliding movement of the wrench unit.

The wrench unit has rotatable sockets 123, driven in one direction or the other in unison by any suitable motor and gear connection. It will be clear that the wrench unit may be drawn toward the base 20, by proper admission of fluid to the cylinder 122, so that the sockets 123 engage the ends 41 of the shafts 39, and that rotation of the sockets causes corresponding shifting of the platen 55. The cylinder 122 will also push the wrench unit away from the base 20, to disengage the sockets 123, by proper admission of fluid thereto.

Since the line of movement of the work W is relatively fixed, it is not desirable that the cutter 101, and the structure carrying the cutter, be moved from relation to the work at any time an adjustment is made to the platen 55. Accordingly, means are herein provided for holding the slide body 67 against movement during adjustment of the platen 55, and in the particular case illustrated, such means comprises a frame work 125 preferably of tubular construction.

Referring particularly to Figures 1, 3, and 8, a cross tube 126 is journalled in bearings 127 carried by the base 20, and tubes 128 extend radially from the tube 126. The tubes 128 at points spaced from the tube 126, form bearings 129 for a cross-shaft 130, and certain of the tubes 128 have extensions 128a supporting bearings 131 at their extremities.

The bearings 131 journal a cross-shaft 132 on which is rigidly mounted an arm 133 having a hook 134 at its extremity. The cross-shaft 130 has a pair of arms 135 rigidly connected thereto, each arm having a hook 136 at its forward end. Sprockets 137 and 138 are respectively carried by shafts 130, 132, and are connected by a chain 139. The shaft 130 also carries a sprocket 140 which is connected by a chain 141 to a sprocket 142 carried by a shaft 143 journalled in the tube 126.

A fluid cylinder 144 of the double action type (see Figure 1) has link connection 145 with the tube 126, so that proper actuation of the cylinder 144 will cause the frame 125 to rock from position shown in full lines in Figure 3 to position shown in dot-dash lines. In position shown in dot-dash lines, the arms 133 and 135 will be positioned so that the hook 134 of arm 133 will be directly above a cross-rod 150 carried by spaced ears 151 formed on the slide body 67 (see Figures 3 and 8), and the hooks 136 of arms 135 will be directly over collars 152 carried by the supports 21.

A lever 153 is connected to sprocket 142, and a double acting fluid cylinder 154 is connected to the free end of lever 153. With the parts shown in dot-dash line position in Figure 3, when fluid is admitted to the cylinder 154 to swing lever 153 counterclockwise, the sprocket and chain connections will cause corresponding rocking movement of shafts 130 and 132 to swing arms 133 and 135 downwardly and cause engagement of hooks 134 and 136 respectively with cross-rod 150 and collars 152, as shown by dotted lines in Figure 3. Thus a rigid connection is effected between the platen supports 21 and the slide body 67, so that when the brake linings 93 are released from pressing engagement with the ways 66, by manual actuation of a valve controlling lever (not shown), the platen 55 may be moved and the slide body 67 will be held stationary, so that relative position of the cutter 101 and the work W is not changed.

From the foregoing, it will be appreciated that revolution of the sleeves 25 at a speed in synchronization with the speed of movement of the work W, will cause the platen 55, and the cutter 101, to shift in a closed path (or to have cyclical movement) laterally disposed with respect to the path of work, and such path approaches and recedes from the line of movement of the work, the path of the cutter and the path of the work substantially intersecting when the cutter is travelling along the forward portion of the path.

Some time during the period when the cutter is travelling along the forward portion of its path, fluid is admitted to the cylinder 105 to cause the beam structure 72 to rapidly dip and return. Such action of the beam structure causes the rapidly rotating cutter 101 to cut through the work W, despite the fact that such work is travelling at high speeds, since the movements of the work and cutter are synchronized.

The path of the cutter may be lessened, as shown in Figure 2, so that the cutter will complete more cycles while moving in its path at the same speed, and thus the number of times the saw is dipped into the work will be greater, accounting for shorter lengths of pipe cut. It will be appreciated that adjustment of the platen 55 provides for an infinite number of lengths of pipe which may be cut. Suitable controls may be utilized to admit fluid to the cylinder 105 to dip the cutter 101 each time the cutter has travelled in its path to reach the work W.

Means are provided whereby multiples of the lengths set for may be effected. In the particular embodiment illustrated, such means are constructed and arranged whereby the cutter may be made to dip only once every two revolutions of the platen 55, instead of every revolution. Such construction would then cut work to a length twice as long as the original setting.

Referring to Figures 1, 2, 13 and 16 through 18, one of the pintle shafts 49 (the lowermost one in Figures 1 and 2) has a gear 157 fixed thereto (see Figure 13) this gear meshing with a gear 158 carried by a shaft 159 spaced from the pintle shaft 49. Also carried by the shaft 159, in spaced relation with respect to the gear 158, is a plate 160 which carries a radially disposed roller 161 adapted to engage within one of four slots 162 in a plate 163 carried by a shaft 164 spaced from the shaft 159. The roller 161 and slotted plate 163 form a Geneva drive, as will be understood.

As the pintle shaft 49 moves through its circular path, the gear 157 will rotate the gear 158 one complete turn for every complete cycle made by the pintle shaft, so that the roller 161 will rotate the plate 163 and shaft 164 a quarter of a turn for each complete turn of the gear 158.

Extending upwardly from the platen 55, and secured to the shaft 164 is a housing 165 having a disc-like portion 166. Extending radially within bores in the portion 166, and spaced 90 degrees apart, are four pins 167, each having a head 168 spring-pressed radially inwardly and into contact with a cam 169. The cam 169 has two recesses 170, and is rotated by a control arm 171 between positions shown in Figures 17 and 18. In Figure 17, all pins 167 are pressed outwardly, whereas in Figure 18, the cam 169 has been rotated by the arm 171 so that diametrically opposed heads 168 fit within the recesses 170 in the cam, so that the respective pins 167 are drawn inwardly of the portion 166.

Referring to Figures 1 and 2, a limit switch 172 is positioned so that its operating arm is adapted to be engaged and tripped by the pins 167. With all pins extended, as shown in Figure 17, each time the platen 55 completes a cycle, a pin 167 will trip the arm of the limit switch 172, and with only two pins 167 extended, the arm of the limit switch will be tripped every two cycles of the platen 55.

The limit switch is electrically connected with suitable mechanism, so that when the switch is tripped, fluid is admitted to the cylinder to move the toggle link connection 103 and cause dipping and return of the cutter 101. It will be appreciated that such dipping movement of the cutter is controlled to coincide with the movement of the platen 55, so that the cutter 101 will dip and return at the time the path of the cutter intersects the path of movement of the work.

In order that an operator may readily know the pipe length for which the machine is set, the wrench unit 120 is provided with gauges 180 and 181 respectively showing the inches and the fraction of inches of pipe length, and the unit 120 also has gauges 182 and 183 also showing the inches and fraction of inches of pipe length, however, in multiples of the readings shown on gauges 180, 181. In this particular embodiment, the readings on gauges 182 and 183 will be twice as great as the readings on gauges 180, 181. This may be effected by choice of comparative scales in the gauges, so that such gauges may be driven by the same mechanism. It will be appreciated that suitable gearing may be interposed between the shafts carrying the sockets 123, and the shafts carrying the scales, so that the scales will indicate the rotative position of the sockets, and thus the adjusted position of the platen 55.

A shutter 185 may be pivotally mounted within the wrench unit 120 and shifted by an actuating element which is electrically connected to an actuating element affected by position of the operating arm 171, so that if the arm 171 is set for dipping of the cutter for each cycle of the platen, the gauges 182, 183 will be covered (as shown in Figure 4) and when the arm 171 is set for dipping of the cutter for each two cycles of the platen, the shutter will shift to cover gauges 180, 181, and uncover the gauges 182, 183. Thus, no possible mistake can be made in the readings. Figure 4a discloses, in diagrammatic form, a means for accomplishing the foregoing. Referring to this figure of the drawings, a lever 205 is connected to the shutter 185 to effect pivotal movement thereof. The lever 205 has connection with an insulating portion connecting the cores of two solenoids 206 and 207. The coils of these solenoids are connected in electrical circuit with two limit switches 208, 209 which may be positioned to be respectively engaged by the control arm 171, or by mechanism movable in unison with the control arm. Thus, a respective one of the two solenoids is energized, depending upon the position of the control arm 171, to shift the lever 205 and effect shifting of the shutter 185.

From the foregoing, it will be apparent to those skilled in the art that we have accomplished at least the principal object of our invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. A machine for cutting moving work, comprising: a base; a pair of arm means rotatably carried by said base, each having a portion extending radially with respect to the axis of rotation; platen means, having pivotal connections with said portions, so that said platen means is shifted in a plane through rotation of said portions; a cutting device carried by said platen means for movement transverse to the plane of shifting of said platen means; and means for moving said cutting device into cutting engagement with said work when said platen means has shifted to position said cutting device adjacent to said work.

2. A machine for cutting moving work, comprising: a base; a pair of arm means rotatably carried by said base, each having a portion extending radially with respect to the axis of rotation; platen means, having pivotal connections with said portions, so that said platen means is shifted in a closed path through rotation of said portions; means for shifting said pivotal connections toward or away from the axis of rotation of said arm means, to vary the path travelled by said platen means; a cutting device movably carried by said platen means; and means for moving said cutting device into cutting engagement with said work when said platen means has shifted in its path to position said cutting device adjacent to said work.

3. A machine for cutting moving work, comprising: a base; a pair of arm means rotatably carried by said base, each having a portion extending radially with respect to the axis of rotation; platen means, having pivotal connections with said portions, so that said platen is shifted in a closed path through rotation of said portions; means for shifting said pivotal connections toward or away from the axis of rotation of said arm means, to vary the path travelled by said platen means; a cutting device, slidably carried by platen means, and movable in a direction transverse to the line of movement of said work; means for holding said cutting device in position relative to said work during shifting of said pivotal connections, said cutting device and said platen means sliding relatively during such operation; and means for moving said cutting device transversely of the line of movement of said work and into cutting engagment with said work when said platen means has shifted in its path to position said cutting device adjacent to said work.

4. A machine for cutting moving work, comprising: a base; a pair of arm means rotatably carried by said base, each having a portion extending radially with respect to the axis of rotation; platen means, having pivotal connections with said portions, so that said platen means is shifted toward and away from said work through rotation of said portions; a cutting device comprising beam means pivotally carried by said platen means for movement generally transversely of the shifting movement of said platen means, said beam means having cutting means adapted to engage said work; and means for pivoting said beam means at the time when said platen means is adjacent to said work to move said cutting means into engagement with said work.

5. A machine for cutting moving work, comprising: a base; a pair of arm means rotatably carried by said base, each having a portion extending radially with respect to the axis of rotation; platen means, having pivotal connections with said portions, so that said platen means is shifted toward and away from said work through rotation of said portions; a cutting device comprising beam means pivotally carried by said platen means for movement generally transversely of the shifting movement of said platen means, said beam means having cutting means at one side of the pivot adapted to engage said work, and toggle link mechanism at the other side of said pivot; means for moving said toggle mechanism from broken, to made, to broken position to effect a dipping and return of said cutting means with respect to said work, said last named means being operable when said platen means is adjacent to said work.

6. A machine for cutting moving work, comprising: a base; a pair of arm means rotatably carried by said base, each having a portion extending radially with respect to the axis of rotation; platen means, having pivotal connections with said portions, so that said platen means is shifted toward and away from said work through rotation of said portions; a cutting device comprising beam means pivotally carried by said platen means for movement generally transversely of the shifting movement of said platen means, said beam means having cutting means at one side of the pivot adapted to engage said work and toggle link mechanism at the other side of said pivot; means for moving said toggle mechanism from broken, to made, to broken position to effect a dipping and return of said cutting means with respect to said work, said last named means being operable when said platen means is adjacent to said work; and means for effecting adjustment of said toggle mechanism to provide for adjustment of movement of said cutting means.

7. A machine for cutting moving work, comprising: a base; a pair of arm means rotatably carried by said base, each having a portion extending radially with respect to the axis of rotation; platen means, having pivotal connections with said portions, so that said platen means is shifted in a closed path through rotation of said portions; means for shifting said pivotal connections toward or away from the axis of rotation of said arm means, to vary the path travelled by said platen means; said platen means having guide ways extending generally transversely of the line of movement of said work; a cutting device, comprising a slide body slidable in said guide ways and having brake means operable to hold said slide body against sliding movement; means for releasing said brake means during shifting of said pivotal connections; and means for holding said slide body against movement during shifting of said pivotal connections, so that said platen means moves relatively with respect to said slide body and so that said slide body is maintained in operating relationship with respect to said work.

8. A machine for cutting moving work, comprising: a base; platen means shiftably carried by said base for movement toward and away from said work; means for adjusting shifting movement of said platen means, comprising a plurality of screw-operated means; and a wrench unit having screw-engaging portions rotatable in synchronization, to effect synchronized adjustment of said screw-operated means.

9. A machine for cutting moving work, comprising: a base; platen means shiftably carried by said base for movement toward and away from said work; means for adjusting shifting movement of said platen means, comprising a plurality of screw-operated means; and a wrench unit having screw-engaging portions rotatable in synchronization, to effect synchronized adjustment of said screw-operated means; and gauge means, readable in measurement units, and co-related with the rotation of said screw-engaging portions.

10. A machine for cutting moving work, comprising: a base; platen means shiftably carried by said base for movement toward and away from said work; means for adjusting shifting movement of said platen means, comprising a plurality of screw-operated means; a wrench unit having screw-engaging portions rotatable in synchronization, to effect synchronized adjustment of said screw-operated means, said screw-engaging portions being movable into and out of engagement with the screws of said screw-operated means; and means for effecting engaging or disengaging movement of said screw-engaging portions.

11. A machine for cutting moving work, comprising: a base; platen means shiftably carried by said base for cyclical movement toward and away from said work; a cutting device, movably carried by said platen means; means for moving said cutting device into cutting engagement with said work when said platen means is adjacent to said work; and means for operating said cutting device moving means in any predetermined cycle of said platen means.

12. A machine for cutting moving work, comprising: a base; platen means shiftably carried by said base for cyclical movement toward and away from said work; a cutting device, movably carried by said platen means; means for moving said cutting device into cutting engagement with said work when said platen means is adjacent to said work; and means for operating said cutting device moving means in any predetermined cycle of said platen means, said means comprising a plurality of contact engaging pins, and means for varying the number of pins effective to engage said contact.

13. A machine for cutting moving work, comprising: a base; platen means shiftably carried by said base for cyclical movement toward and away from said work; a cutting device, movably carried by said platen means; means for moving said cutting device into cutting engagement with said work when said platen means is adjacent to said work; and means for operating said cutting device moving means in any predetermined cycle of said platen means, said means comprising a plurality of contact engaging pins, a Geneva drive for moving said pins into engagement with said contact, and cam means for varying the number of pins effective to engage said contact.

14. A machine for cutting moving work, comprising: a base; platen means shiftably carried by said base for cyclical movement toward and away from said work; means for adjusting shifting movement of said platen, comprising a plurality of screw-operated means; a wrench unit having screw engaging portions rotatable in synchronization to effect synchronized adjustment of said screw operated means; a cutting device, movably carried by said platen means; means for moving said cutting device into cutting engagement with said work when said platen means is adjacent to said work; means for operating said cutting device moving means in any predetermined cycle of said platen means, to provide cutting of predetermined work lengths and multiples of said lengths; gauge means corresponding to the lengths and multiples of lengths of said work, operable in co-relation with said wrench unit; and shutter means movable to present for reading only that gauge means which corresponds to the lengths of work cut.

15. A machine for cutting moving work, comprising: a support movable in a path adjacent to the line of movement of said work; cutting means carried by said support; means for moving said cutting means into cutting engagement with said work at a predetermined time; means providing for adjustment of position of said support with respect to said cutting means; and means adapted to engage and hold said cutting means during adjustment of said support relative to said cutting means, whereby the position of said cutting means relative to the work is not disturbed.

16. A machine for cutting moving work, comprising: a base; arm means rotatably carried by said base and extending radially with respect to the axis of rotation; platen means, having pivotal connection with said arm means and movable in a closed path through means of such connection; means for shifting said pivotal connection toward and away from the axis of rotation of said arm means, to vary the path travelled by said platen means; cutting means carried by said platen means; means providing for relative sliding movement between said cutting means and said platen means in a direction transverse to the line of movement of said work; and means for holding said cutting means in position relative to said work during shifting of said pivotal connection, said cutting means and said platen means sliding relatively during such operations.

17. A machine for cutting moving work, comprising: a base; arm means rotatably carried by said base and extending radially with respect to the axis of rotation; platen means, having pivotal connection with said arm means, and movable in a closed path through means of such connection; means for shifting said pivotal connection toward and away from the axis of rotation of said arm means, to vary the path travelled by said platen means; cutting means carried by said platen means, and shiftable into cutting engagement with said work; and means rigidly connecting said arm means and said cutting means during shifting of said pivotal connection whereby said cutting device is maintained in position relative to said work.

18. A machine for cutting moving work, comprising: a base; arm means rotatably carried by said base and extending radially with respect to the axis of rotation; platen means, having pivotal connection with said arm means, and movable in a closed path through means of such connection; means for shifting said pivotal connection toward and away from the axis of rotation of said arm means, to vary the path travelled by said platen means; cutting means carried by said platen means, and shiftable into cutting engagement with said work; and means for holding said cutting means in position relative to said work during shifting of said pivotal connection, comprising a frame swingable to position adjacent to said arm means and said cutting means, and comprising also a pair of arms swingably carried by said frame and swingable to latching relation with respect to respective portions of said arm means and said cutting means and operable to maintain said arm means and said cutting means against relative movement.

19. Apparatus for severing predetermined lengths from continuous stock advancing in a longitudinal direction along a predetermined path comprising, a cutting device, a carrier for said device, means for moving said carrier about a gyratory path located adjacent to the path of said stock, means for moving said cutting device into engagement with said stock at a predetermined time, adjustment means cooperable with said carrier moving means for changing the size of said gyratory path yet maintaining the configuration of such path, and means operable during adjustment of said gyratory path for maintaining the cutting relationship between said cutting device and said stock.

References Cited in the file of this patent

UNITED STATES PATENTS

| | | |
|---|---|---|
| 556,857 | Madden | Mar. 24, 1896 |
| 1,848,820 | Biggert | Mar. 8, 1932 |
| 2,202,889 | Bates | June 4, 1940 |
| 2,332,013 | Rudert | Oct. 19, 1943 |
| 2,618,047 | Mansell | Nov. 18, 1952 |